United States Patent [19]

Takahashi

[11] Patent Number: 5,600,744
[45] Date of Patent: Feb. 4, 1997

[54] OPTICAL FIBER LIGHT COUPLING INTERFACE AND METHOD FOR MAKING SAME

[75] Inventor: Mitsuo Takahashi, Matsudo, Japan

[73] Assignee: Seikoh Giken Co., Ltd., Matsudo, Japan

[21] Appl. No.: 426,914

[22] Filed: Apr. 21, 1995

[30] Foreign Application Priority Data

Nov. 11, 1994  [JP]  Japan ................................. 6-303040

[51] Int. Cl.⁶ ........................................................ G02B 6/32
[52] U.S. Cl. ................................................. 385/38; 385/35
[58] Field of Search ................................... 385/33–35, 61, 385/74, 79, 93

[56] References Cited

U.S. PATENT DOCUMENTS

| | | | |
|---|---|---|---|
| 4,269,648 | 5/1981 | Dakss et al. ............................... | 385/35 |
| 4,831,784 | 5/1989 | Takahashi ............................... | 51/131.1 |
| 4,889,399 | 12/1989 | Mariani et al. .......................... | 385/35 |
| 4,979,334 | 12/1990 | Takahashi ............................... | 51/120 |

OTHER PUBLICATIONS

Institute of Electronics, Information and Communication Engineers, (1990), "A New Scheme of Coupling from LD to SMF Utilizing a Beam-Expanding Fiber With a Hemispherical End", Shiraishi et al.

IEEE Journal of Lightwave Technology, Feb. 1993, vol. 11, No. 2, pp. 252–257, "Ideal Microlenses for Laser to Fiber Coupling", Edwards et al.

*Primary Examiner*—John Ngo
*Attorney, Agent, or Firm*—Spencer & Frank

[57]  ABSTRACT

An optical fiber interface for coupling input light power from a light source to an optical fiber. The optical fiber has an optical axis, an incident end face extending transverse to the optical axis, a core region having a predetermined diameter, and a clad region surrounding the core region. The end face comprises a first surface portion having the shape of an element of a sphere. The sphere has a center on the optical axis and a diameter not greater than the diameter of the core region. The first surface portion of the end face is symmetrical with respect to the optical axis and extends from the optical axis along the core region toward the clad region. The end face also comprises a second surface portion having the shape of an element of a cone extending from the first surface portion of the end face along the clad region, the second surface portion being tangential to the first surface portion of the end face.

4 Claims, 4 Drawing Sheets

$\Theta_{IC} = \Theta_I > \beta$
$\Theta_{IS} = \Theta_I \leq \beta$

OPTICAL FIBER LIGHT COUPLING INTERFACE AND METHOD FOR MAKING SAME

BACKGROUND OF THE INVENTION

1. Field of The Invention

This invention relates to an optical fiber light coupling interface between a light source, such a laser diode or LED and the end of an optical fiber and the method for making same.

2. Prior Art

A number of proposals have been made for an optical fiber interface wherein a graded index lens (i.e., Selfoc lens) and/or a convex lens is inserted into the gap between a light source and an optical fiber. This type of optical fiber interface has such problems that the optical axes of the respective elements can not easily be aligned, and that the inclination of the optical axis of a certain element, even if the inclination is a minor one, drastically increases the light coupling loss. These problems prompted a number of studies on the direct coupling of light power from a light source to the optical fiber. For instance, a direct light coupling system has been described in a paper entitled "A new scheme of coupling from LD to SMF utilizing a beam-expanding fiber with a spherical end", Shirai, et.al., presented at the 1990 Spring National Conference of the Institute of Electronics, Information and Communication Engineers.

A basic configuration of a light coupling device to couple the light source to the single-mode optical fiber, wherein the light source, i.e., a laser diode (LD) or a light emitting diode (LED), is directly coupled to the optical fiber end-face without the use of any optical lens systems, will be described hereafter.

FIG. 6 shows an example of the above mentioned light coupling device to couple the light source to the single-mode optical fiber, wherein the light power input end-face is perpendicular to the optical axis thereof. A light power 4 which radiates from a light source 1, i.e., a laser diode (LD), enters into an optical fiber end-face consisting of an optical fiber core 2 and an optical fiber clad 3.

The light power 4 which is radiated from the laser diode (LD), if a laser diode is used as the light source, is produced by a coherent beam distributed around the optical axis thereof in accordance with the Gaussian function in terms of a radiation angle $\theta_1$ of the light power 4 and will cause diffraction. The radiation pattern is thus elliptical in shape. The elliptically shaped light beam has a major axis XX' which measures 40 to 60 degrees from the light source and a minor axis YY' which measures 20 to 30 degrees from the light source.

Transmission angle $\theta_2$ at which the light power can be transmitted within optical fiber core 2 should be equal to or less than threshold angle $\theta_c$. That is:

$$\theta_2 \leq \theta_c = \cos^{-1}(n_2/n_1)$$

where $n_1$ is the refractive index of the optical fiber core, and $n_2$ is the refractive index of the optical fiber clad. If we assume $n_1=1.47$ and $n_2=1.467$ for a single-mode optical fiber, then $\theta_c=3.661$ degrees can be obtained.

If transmission angle $\theta_2$ satisfies the expression $\theta_2 \leq \theta_c$ for the transmission of the light power within the optical fiber core 2, the value $n_0 \sin \theta_1$ should be equal to or less than the numberical aperture NA of the optical fiber core. That is:

$$n_0 \sin \theta_1 \leq NA = n_1 \sin \theta_c$$

where $n_0$ is the refractive index of air ($n_0=1$).

The numerical aperture NA of the optical fiber core for a threshold angle $\theta_c$ of 3.661 degrees is easily determined since the values of $n_1$ and $\theta_c$ are nown. Thus, $\theta_c$ is calculated as being less than or equal to 5.38 degrees ($\theta_1 \leq 5.38$). If the average radiation angle for all light power flux 4 is 25 degrees, and the corresponding effective indicent angle $\theta_1$ to the end-face of optical fiber core 2 is limited to 5.38 degrees or less ($\theta_1 \leq 5.38$), the percentage of the light power transmitted through the optical fiber core for a single-mode optical fiber to that which is radiated from the light source is approximately 20% if all other losses are disregarded.

If the light power enters on the optical fiber core at an incident angle $\theta_1$ of greater than 5.38 degrees, it also enters into the optical fiber clad 3, and will therefore be lost from the optical fiber core during the transmission through the optical fiber. This is the reason that the light coupling loss occurs. As suggested in FIG. 6, transmission angle $\theta_2$ increases with radiation angle $\theta_1$ and finally becomes greater than threshold angle $\theta_c$ causing light coupling loss. In order to increase the light coupling efficiency measured from the light source to the optical fiber core, transmission angle $\theta_2$ should be equal to or less than threshold angle $\theta_c$ for all radiation angles $\theta_1$. A direct light coupling system of this type has thus not been used in most light coupling.

As described heretofore, the light coupling efficiency at the interface between the light source and the optical fiber in the direct light coupling system is inherently low. Many experiments have been done to improve the light coupling efficiency in the direct light coupling system. Among those, a typical example is shown in FIG. 5.

An optical fiber consisting of an optical fiber core 5 and an optical fiber clad 6 is fused, drawn, and cut to form tapered section 7 whose diameter is gradually decreased toward the end-face thereof so that mode radius ω of the optical fiber core 5 is extended toward the end-face thereof. A hemispherically shaped microlens 8 is formed at the end of the optical fiber so as to improve the light coupling efficiency.

An example of the above optical fiber is described in IEEE Journal of Lightwave Technology, Vol. 11, No. 2, pp. 252–257 (February 1993).

If the ratio of distance S between the light source and the optical fiber end-face to radius R of microlens 8 is properly defined in the aforementioned example, transmission angle $\theta_2$ can be equal to or less than threshold angle $\theta_c$ in a wide range of radiation angles $\theta_1$. In this case, incident angle α is equal to $(\theta_1+\theta_a)$ where $\theta_a$ will be described hereafter. If incident angle α is greater than Brewster's angle $\theta_B$, the reflection of the light power at the optical fiber end-face increases and the transmitted light power decreases.

Brewster's angle $\theta_B$ is expressed as follows:

$$\theta_B = \tan^{-1} n_2$$

$\theta_B$ is 55.77 degrees for $n_2=1.47$. As radiation angle $\theta_1$ increases, angle $\theta_a$ between point $P_1$ on the hemisphere and optical axis ZZ' rapidly increases. That is; incident angle α becomes equal to Brewster's angle $\theta_B$ for a small amount of increase in radiation angle $\theta_1$. According to calculations, incident angle a is nearly equal to $\theta_B$ ($\alpha \doteq \theta_B$) at radiation angle ($\theta_1$) of approximately 18 degrees for S=1.6R. Transmission angle $\theta_2$ is nearly equal to 3.6 degrees ($\theta_2 \doteq 3.6°$) at a radiation angle of approximately 18 degrees, which is nearly equal to optical fiber threshold angle $\theta_c$. Note that this fact is important.

The light power radiated at a radiation angle of greater than 18 degrees ($\theta_1 > 18°$) is not propagated along the optical fiber core causing the light power loss. According to the IEEE Journal of Lightwave Technology, Vol. 11, No. 2, pp. 252–257 (February 1993), a paraboloidal surface of an optical fiber end-face (not shown), which is formed by a laser welding machine, is proposed so that transmission angle $\theta_2$ is set to be nearly equal to 0 degree ($\theta_2 \doteq 0°$) regardless of radiation angle $\theta_1$. The optical property change due to fusing of the optical fiber end-face, however, is unknown in this proposal, which leaves room for improvement in processing machines and techniques.

A paper entitled "A New Scheme of Coupling from LD to SMF Utilizing a Beam-expanding Fiber with a Spherical End", by Shirai et. al., presented at the 1990 Spring National Conference of the Institute of Electronics, Information and Communication Engineers, described an optical fiber having a spherical end-face, and points out that the optical loss due to inclination of the optical axis for the spherical end-face is Greater than that for the standard sinGle-mode optical fiber end-face. See FIG. 6 for details.

As described heretofore, a light coupling lens wherein an optical fiber end-face structure such as that which is disclosed in this specification is formed at the front end of the light coupling lens. This lens has been disclosed in Japanese Patent Application KOKAI 1987-81615 in 1987. Obtaining optical axis alignment with the disclosed structure is difficult since the inclination of the optical axis greatly affects the light coupling loss, which has been described heretofore.

As described heretofore, effective light coupling from the light source directly to the optical fiber is difficult; however, direct light coupling from the light source to the optical fiber is attractive in that it allows the designer to construct a light coupling device of simple structure.

SUMMARY OF THE INVENTION

An object of the present invention is to provide an optical fiber interface having an improved end-face structure, which couples the light power from the light source to the optical fiber at a high light coupling efficiency, and the other object of the present invention is to provide the method of fabrication thereof.

In order to accomplish the object of the present invention, an optical fiber interface to couple a light source to an optical fiber, which is built in accordance with the present invention, provides an incident end-face structure of the optical fiber core, consisting of a sphere whose center lies on the optical axis of the optical fiber, and part of a conical surface tangent to the sphere.

In the optical fiber interface to couple the light source to the optical fiber, radius R of the sphere can be built smaller than mode radius ω of the optical fiber and the inclination angle β of the part of a conical surface can be equal to or greater than 25 degrees ($\beta \geq 25°$) with respect to the plane perpendicular to the optical axis of the optical fiber.

In the optical fiber interface to couple the light source to the optical fiber, the distance S between the light source and the optical fiber end-face can be equal to or greater than radius R.

In the optical fiber interface to couple the light source to the optical fiber, the following expression (1) is valid for the light beam incident on a sphere from the light source a following expression (2) is valid for the light beam input to a part of a conical surface from the light source.

$$\theta_c \geq \theta_2 = \sin^{-1}\{\sin(\theta_1+\theta_1)\}/n_1-\theta_a \quad (1)$$

$$\theta_c \geq \theta_2 = \sin^{-1}\{\sin(\theta_1+\beta)\}n_1-\beta \quad (2)$$

where $\theta_c$: threshold angle of the optical fiber core.

$\theta_2$: transmission angle of the light beam entered into the optical fiber core.

$\theta_1$: radiation angle of the light beam from the light source.

$n_1$: refractive index of the optical fiber core.

$\theta_a$: angle between the optical axis of the optical fiber and the normal line leading from the incident point on the sphere to the center of the sphere when the light beam is radiated from the light source at radiation angle $\theta_1$.

According to the invention, a method of fabricating an optical fiber interface to couple a light source to an optical fiber comprises the steps of:

inserting an optical fiber into a ferrule and fastening the optical fiber to the ferrule;

forming a conical surface at the end surface of the optical fiber by using a cylindrical grinder; and forming a spherical surface at the end of the conical surface of the optical fiber by using a spherical grinder.

In the method of fabricating the optical fiber interface to couple the light source to the optical fiber, a spherical grinder to polish the optical fiber end-face is a polishing device to polish the optical fiber end-face with an abrasive material on a surface of an elastic material disk when the elastic material disk whose surface is covered with the abrasive material revolves around its revolving axis while the revolving axis rotates with respect to the optical fiber end-face.

DETAILED DESCRIPTION OF THE PREFERRED EMBODIMENTS

Figure 1:
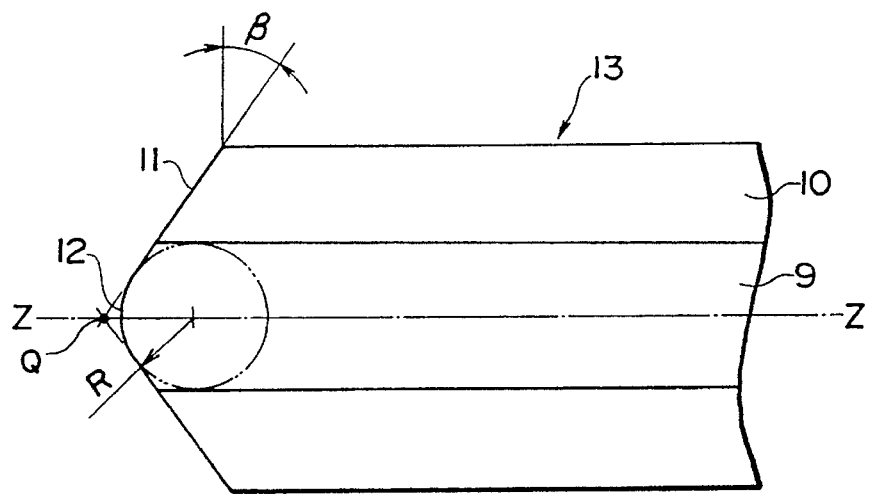
FIG. 1 shows a schematic cross-sectional view of an optical fiber end-face used as an optical fiber interface to couple a light source to the optical fiber, which is built in accordance with the present invention.

The present invention will be described in detail referring to the drawings.

FIG. 1 shows a schematic cross-sectional view of a single-mode optical fiber end-face structure to couple light power from a light source to an optical fiber, showing an embodiment of an optical fiber interface to couple the light source to the optical fiber, which is built in accordance with the present invention.

An end-face structure of a core 9 and a clad 10 of a single mode optical fiber 13 consists of a sphere with radius R whose center lies on the optical axis (z—z) of the optical fiber, and a conical surface 11 whose central line lies on the optical axis thereof, and is tangent to the sphere. Point Q in FIG. 1 indicates the vertex of the conical surface which lies on the Z coordinate.

An inclination angle β of the conical surface with respect to the plane which is perpendicular to the optical axis is 35 degrees (β=35°) in this embodiment, and the radius R of the sphere 12 is 5 μm (R=5 μm).

The fabrication method of the single-mode optical fiber end-face to couple the light source to the optical fiber will be described hereinafter. The single-mode optical fiber is inserted into a hole at the center of a cylindrical ferrule (not shown) and fastened thereto by wax. Thereafter, the endface of the conical surface 11 is formed by polishing the cylindrical ferrule with a conventional cylindrical grinder (not shown).

After that, the conical end-face at the end of the optical fiber is pushed toward an elastic material disk (not shown) of a conventional optical fiber end polishing machine. As the elastic material disk whose surface is covered with an abrasive material revolves around its revolving axis, while the revolving axis rotates with respect to the optical fiber end-face. During these operations, the vertex of conical surface 11, which is formed by using the spherical grinder, is formed into a sphere 12. The conventional optical fiber end polishing machine and polishing method are described in the Japanese Patent Application No. 1994-184060 in 1994. Other grinders specified by U.S. Pat. No. 4,831,784 and U.S. Pat. No. 4,979,334 can also be used for this purpose.

After the polishing is completed the temperature of the optical fiber and ferrule is elevated to 120° C. so that the wax which fastens the optical fiber to the ferrule is melted, and the optical fiber is removed from the hole at the center of the ferrule. The optical formation of the fiber end-face is thus completed.

The optical fiber end-face to couple the light source to the optical fiber, which has been fabricated in the manner described heretofore, can be fastened to an aligned V groove provided on the surface of a flat plate so as to use it in practical applications.

If the optical fiber end-face to couple the light source to the optical fiber is used together with the ferrule wherein the optical fiber end-face is installed, epoxy resin or soldering can be used in place of the wax so that the optical fiber is permanently fastened to the ferrule.

Figure 2:
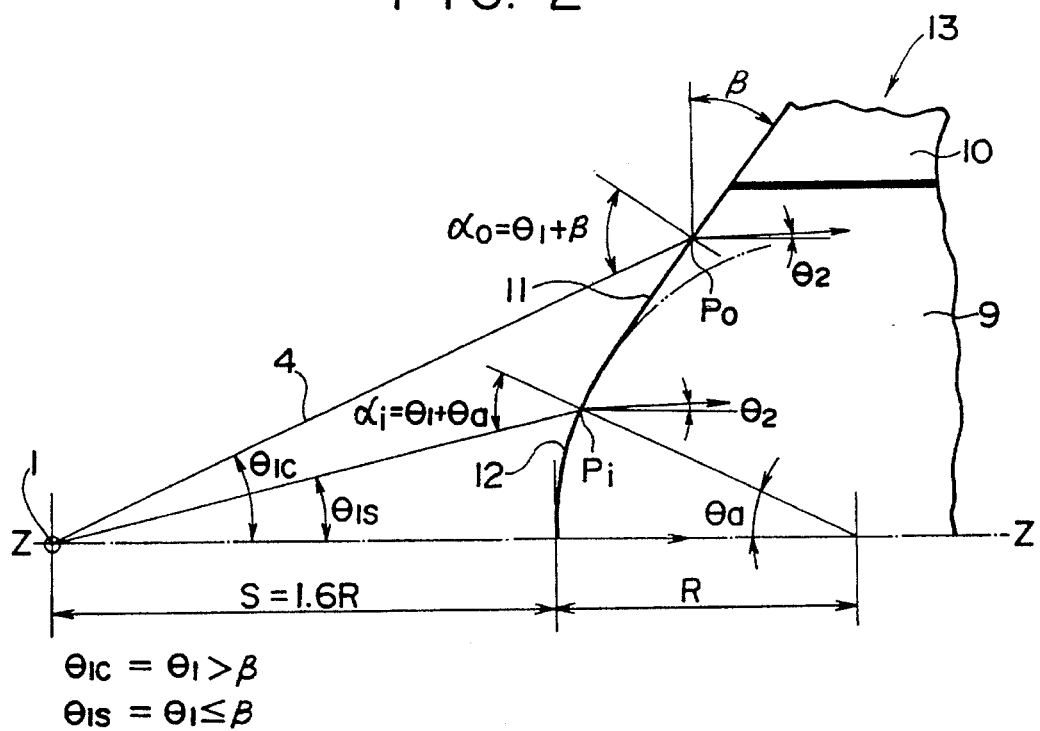
FIG. 2 shows optical paths of incident light beam in the optical fiber end-face of FIG. 1.

FIG. 2 also shows the relationship between the optical fiber end-face and a light source when the optical fiber endface to couple the light source to the optical fiber is built in accordance with the present invention.

Assume that angle β of inclination on the surface of the conical surface is 35 degrees (β=35°). Distance S between light source 1 and the end-face of optical fiber 13 to couple the light source 1 to optical fiber 13 is determined to be 1.6R in terms of radius R of sphere 12 at the end-face of an optical fiber 13. That is S=1.6R.

The light power incidence on the surface of sphere 12 from the light source will be discussed hereafter.

Assume that angle $\theta_a$ is defined as the angle between the line leading from incident point $P_i$ to the center of the sphere and the optical axis Z—Z. Note that $\theta_a < \beta = 35°$.

The light power incidence on a point on the sphere will be described hereafter.

Incidence angle αi for the light beam incidence on incident point $P_i$ is given by $$\alpha_i = \theta_a + \theta_{1s} = \tan^{-1}\{\sin\theta_a/(2.6-\cos\theta_a)\} + \theta_a$$

For the case where $\theta_a$ is 35 degrees ($\theta_a=35°$), a radiation angle $\theta_1$ becomes 17.85 degrees ($\theta_{1s}=17.85°$) and an incident angle $\alpha_i$ becomes 52.85 degrees ($\alpha_i=52.85°$). The light beam at a radiation angle $\theta_1$ of 17.85 degrees or less ($\theta_{1s}=\theta_1\leq 17.85°$) can be incident on the surface of the sphere.

The light beam incidence on the conical surface outside the sphere will be discussed hereafter. For the light beam at a radiation angle $\theta_1$ of 17.85 degrees or more ($\theta_{1c}=\theta_1>17.85°$), incident angle $\alpha_0$ at incident point $P_0$ is calculated by $$\alpha_0 = \theta_{1c} + \beta = \theta_{1c} + 35$$

This equation means that incident angle $\alpha_0$ is given by the sum of radiation angle $\theta_{1c}$ and angle β of inclination of the conical surface when angle β is equal to 35 degrees.

Figure 5:
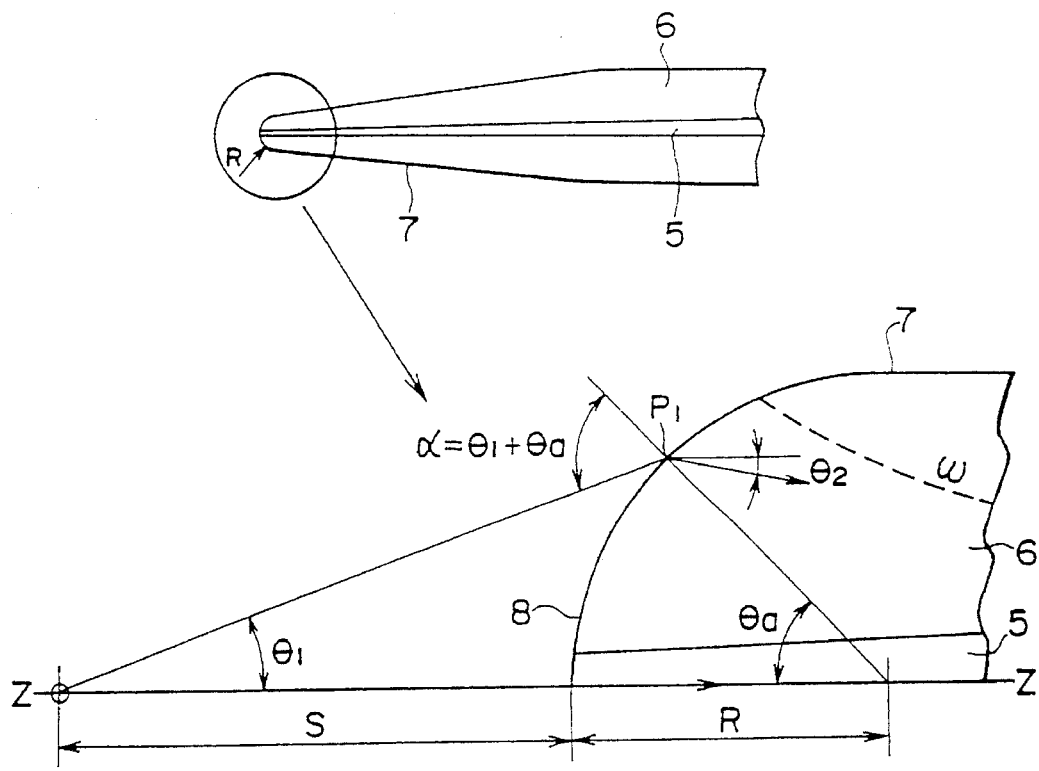
FIG. 5 shows a structure and an optical path of an optical fiber end-face which constitutes a sphere in the prior art (refer to plot B of FIG. 3).

If compared with the sphere at the optical fiber end-face shown in FIG. 5, the light beam at larger radiation angle $\theta_1$ than that which is defined in FIG. 5 can be input to the optical fiber on condition that $\theta_2 \leq \pm\theta_c$.

Figure 3:
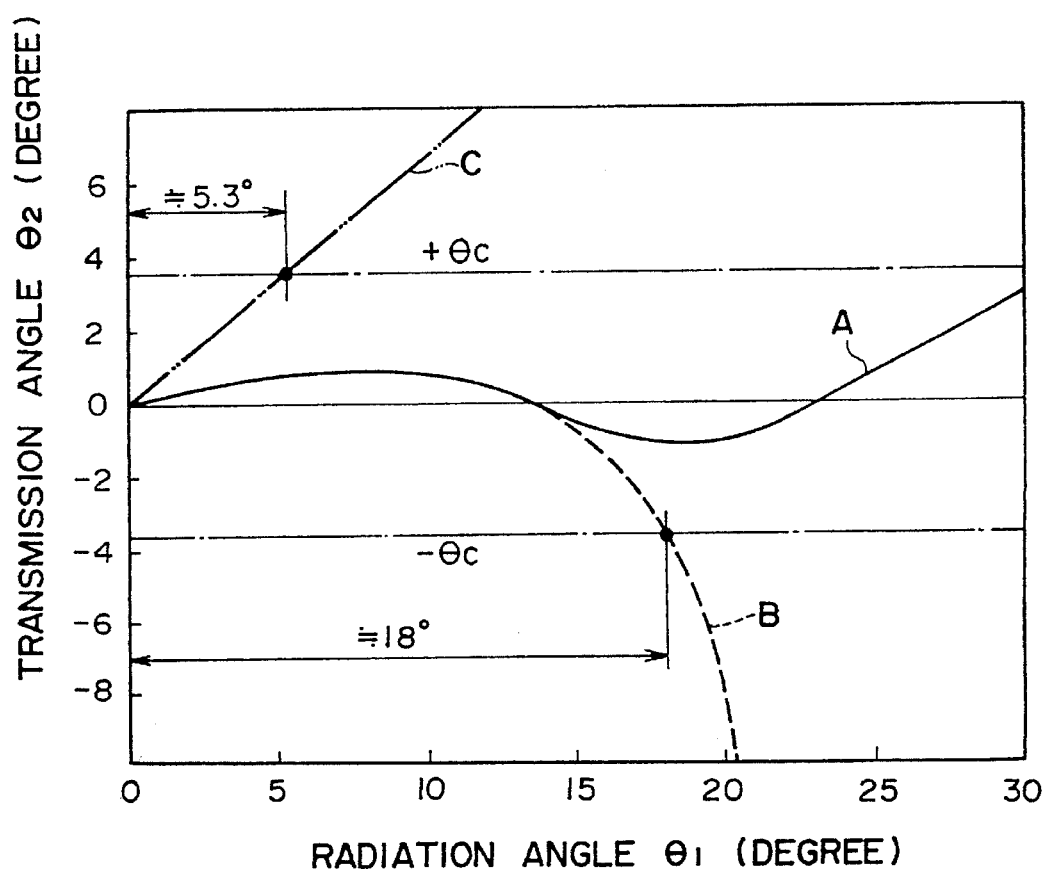
FIG. 3 shows transmission angles $\theta_2$ in terms of radiation angles $\theta_1$ for the optical fiber end-face built in accordance with the present invention (plot A), for that which constitutes a sphere (plot B), and for that which constitutes a plane perpendicular to the optical axis thereof (plot C), respectively.

FIG. 3 shows a series of graphs where transmission angle $\theta_2$ is given in terms of radiation angle $\theta_1$ of the optical fiber end-face to couple the light source to the optical fiber in the optical fiber interface.

Plot A indicates transmission angle $\theta_2$ in terms of radiation angle $\theta_1$ for the optical fiber end-face to couple the light source to the optical fiber, which is built in accordance with the present invention.

Plot B indicates transmission angle $\theta_2$ in terms of radiation angle $\theta_1$ for the optical fiber end-face to couple the light source to the optical fiber, which is built using such an optical fiber end-face (which constitutes a ball) as shown in FIG. 5.

Figure 6:
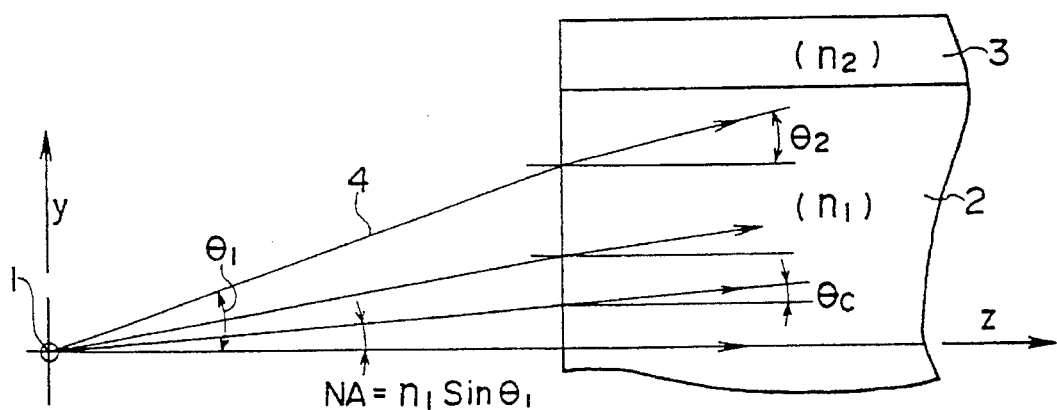
FIG. 6 shows a single-mode optical fiber end-face which constitutes a plane perpendicular to the optical axis thereof, which belongs to the techniques in the prior art.

Plot C indicates transmission angle $\theta_2$ in terms of radiation angle $\theta_1$ for the optical fiber end-face to couple the light source to the optical fiber, which is built using such an optical fiber end-face (which has a flat surface which is perpendicular to the optical axis thereof) as shown in FIG. 6.

As shown in FIG. 3, the optical fiber end-face of plot A is characterized in that the light beam at the radiation angle ($\theta_1$) of up to 32 degrees can be transmitted through the optical fiber on condition that $\theta_2 \leq \pm\theta_c$. The optical fiber end-face of plot B is characterized in that the light beam at a radiation angle ($\theta_1$) of approximately up to 18 degrees can be transmitted on condition that $\theta_2 \leq \pm\theta_c$. The optical fiber end-face of plot C is characterized in that the light beam at a radiation angle ($\theta_1$) of approximately up to 5.3 degrees can be transmitted on condition that $\theta_2 \leq \pm\theta_c$.

Figure 4:
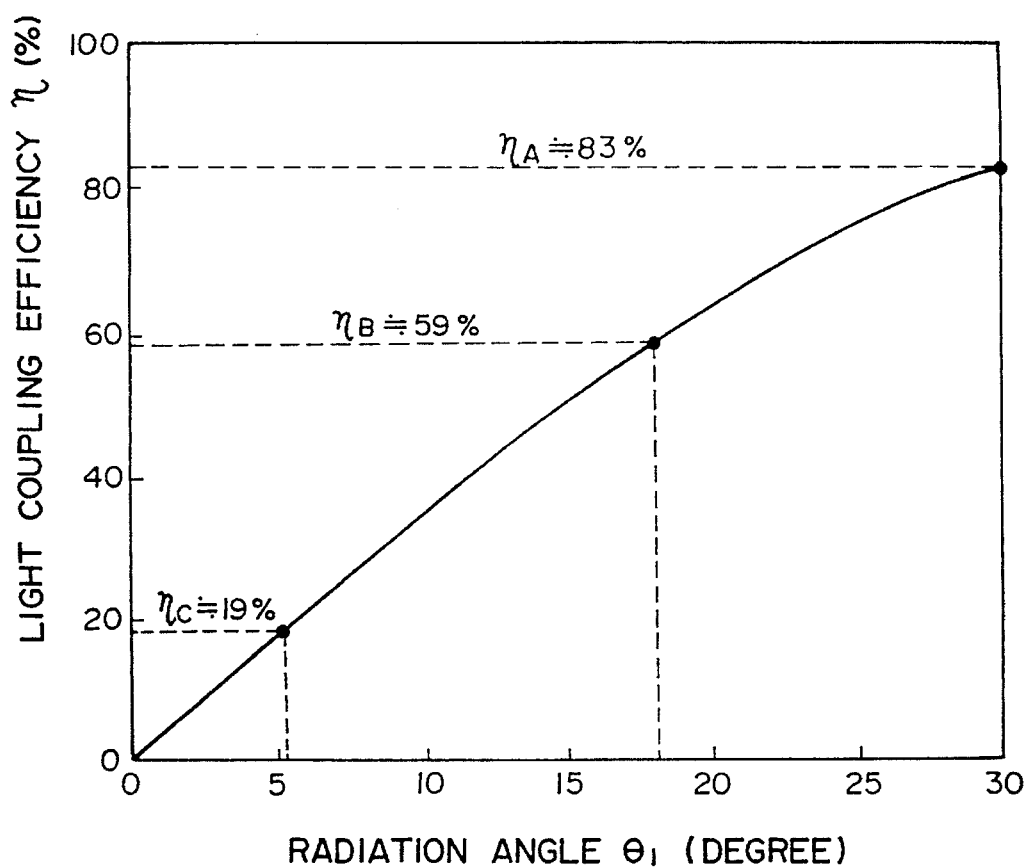
FIG. 4 shows light coupling efficiencies $\eta_A$, $\eta_B$ and $\eta_C$ for plots A, B and C of FIG. 3, when a laser diode is used as a light source, where any additional light losses other than those described herein are disregarded.

FIG. 4 shows light coupling efficiencies $\eta_A$, $\eta_B$ and $\eta_C$ for plots A, B and C of FIG. 3, respectively. In FIG. 4, a laser diode is used as a light source and additional light losses are disregarded.

As shown in FIG. 4, light coupling efficiency $\eta_A$ for the optical fiber end-face of plot A is nearly equal to 83% on condition that $\theta_2 < \pm\theta_c$. Light coupling efficiency $\eta_B$ for the optical fiber end-face of plot B is nearly equal to 59% on condition that $\theta_2 \leq \pm\theta_c$. Light coupling efficiency $\eta_C$ for the optical fiber end-face of plot C is nearly equal to 19% on condition that $\theta_2 \leq \pm\theta_c$.

The light coupling efficiency for the single-mode optical fiber end-face is actually estimated to be approximately 70% due to light beam reflection at the optical fiber end-face and due to alignment errors in optical axes.

Angle β of inclination on the conical surface, radius R of the sphere, and distance S between the light source and the optical fiber end-face are, in the embodiment of the present invention, examples which are measured for the standard single-mode optical fiber. Depending on the parameters of the optical fiber used, the optimum values which satisfy the following expressions should be selected as the design values.

For the light beam incidence on the spherical portion of the optical fiber, $$\theta_c \geq \theta_2 = \sin^{-1}\{\sin(\theta_1+\theta_a)\}/n_1 - \theta a \quad (1)$$

For the light beam incidence on the conical portion of the optical fiber, $$\theta_c \geq \theta_2 = \sin^{-1}\{\sin(\theta_1+\beta)\}/n_1 - \beta \quad (2)$$

The optical fiber interface to couple the light source to the optical fiber, which is built in accordance with the present invention, can receive the light power on the surface of the spherical portion of the optical fiber end-face for the light beam radiated from the light source at a low radiation angle, and receive the light power on the surface of the conical portion of the optical fiber end-face for the right beam radiated from the light source at a high radiation angle. The light beams input from the light source over the wide range of radiation angles can be converted into the light beams at transmission angles within the threshold angle.

The light coupling efficiency to couple the light source to the single-mode optical fiber can thus be improved.

The optical fiber end-face to couple the light source to the optical fiber can easily be fabricated using conventional fabrication facilities and techniques.

The present invention can be applied to any other types of optical fibers other than the standard single-mode optical fibers, i.e., an optical fiber of a dispersion shifted fiber, a polarization maintaining fiber or a optical fiber with an extended mode field diameter which is extended to 20 to 40 μm by drawing and fusing the optical fiber, if parameter values are properly selected.

What is claimed is:

1. An optical fiber interface for coupling input light power from a light source to an optical fiber, said optical fiber having an optical axis, an incident end face extending transverse to said optical axis, a core region having a predetermined diameter, and a clad region surrounding said core region, wherein said end face comprises:

a first spherical surface portion with the center thereof on said optical axis and having a diameter not greater than the diameter of the core region, the first spherical surface portion of said end face being symmetrical with respect to said optical axis and extending from said optical axis along said core region toward said clad region; and a second conical surface portion extending from the first spherical surface portion of said end face along said clad region, said second conical surface portion being tangential to the first spherical surface portion of said end face.

2. The optical fiber interface according to claim 1, wherein:

the optical fiber has a mode radius ω;

the first spherical surface portion has a radius R, radius R being smaller than the mode radius ω; and the second spherical portion defines an angle of inclination β with respect to a plane perpendicular to the optical axis of the optical fiber, the angle of inclination β being equal to or greater than 25 degrees.

3. The optical fiber interface according to claim 2, wherein the light source and the end face defines a distance S therebetween, distance S being equal to or greater than radius R.

4. The optical fiber interface according to claim 2, wherein:

the optical fiber includes a core and a clad having refractive indices $n_1$ and $n_2$ respectively, said refractive indices defining a threshold angle $\theta_c$, a light beam from the light source incident on one of said first spherical surface portion and said second conical surface portion at a corresponding point of incidence making a radiation angle $\theta_1$ at the light source and a transmission angle $\theta_2$ within the core at the corresponding point of incidence with respect to said optical axis, said transmission angle $\theta_2$ being not greater than the threshold angle $\theta_c$, and a line leading from the center of the sphere to the point of incidence defining an angle $\theta_a$ with respect to the optical axis of the optical fiber, such that:

for the light beam from the light source incident on the first Spherical surface portion:

$$\theta_c \geq \theta_2 = \sin^{-1}\{\sin(\theta_1+\theta_a)\}/n_1 - \theta_a;$$

and for a light beam from the light source incident on the second conical surface portion:

$$\theta_c \geq \theta_2 = \sin^{-1}\{\sin(\theta_1+\beta)\}/n_1 - \beta.$$

* * * * *